United States Patent
Sun et al.

(10) Patent No.: US 12,438,759 B2
(45) Date of Patent: Oct. 7, 2025

(54) CODEBOOK AND NON-CODEBOOK SUPPORT FOR SRS WITH 6 PORTS

(71) Applicant: Apple Inc., Cupertino, CA (US)

(72) Inventors: Haitong Sun, Cupertino, CA (US);
Dawei Zhang, Saratoga, CA (US);
Hong He, San Jose, CA (US); Jie Cui, San Jose, CA (US); Seyed Ali Akbar Fakoorian, San Diego, CA (US); Sigen Ye, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 17/934,632

(22) Filed: Sep. 23, 2022

(65) Prior Publication Data
US 2024/0106690 A1    Mar. 28, 2024

(51) Int. Cl.
*H04L 27/26* (2006.01)
*H04W 72/23* (2023.01)

(52) U.S. Cl.
CPC ...... *H04L 27/2613* (2013.01); *H04L 27/2605* (2013.01); *H04W 72/23* (2023.01)

(58) Field of Classification Search
CPC . H04L 27/2613; H04L 27/2605; H04W 72/23
See application file for complete search history.

(56) References Cited

U.S. PATENT DOCUMENTS

| | | | | |
|---|---|---|---|---|
| 12,081,495 B2* | 9/2024 | Sun | | H04L 27/2607 |
| 2022/0231812 A1* | 7/2022 | Go | | H04W 52/325 |
| 2022/0239431 A1* | 7/2022 | Okamura | | H04W 52/146 |
| 2023/0239863 A1* | 7/2023 | Wang | | H04L 5/0051 |
| | | | | 370/329 |
| 2023/0353303 A1* | 11/2023 | Rahman | | H04L 5/0051 |
| 2023/0354310 A1* | 11/2023 | Huang | | H04L 5/0053 |
| 2024/0121043 A1* | 4/2024 | Khoshnevisan | | H04L 5/0051 |
| 2024/0259158 A1* | 8/2024 | Wang | | H04B 7/0404 |
| 2024/0380549 A1* | 11/2024 | Zheng | | H04L 27/2613 |
| 2024/0422038 A1* | 12/2024 | Wang | | H04L 27/26025 |

OTHER PUBLICATIONS

3gpp TS 18.211 v15.3.0 (Year: 2020).*

* cited by examiner

*Primary Examiner* — Asad M Nawaz
*Assistant Examiner* — Hugh Mark Ashley
(74) *Attorney, Agent, or Firm* — Fay Kaplun & Marcin, LLP

(57) ABSTRACT

A user equipment (UE) is configured to receive a sounding reference signal (SRS) configuration from a network, wherein the SRS configuration comprises a 6 port SRS configuration. The UE is also configured to transmit, from each of the 6 ports, SRS on one or more SRS resources corresponding to the SRS configuration.

20 Claims, 7 Drawing Sheets

| SRS 505 | Cyclic Shift 510 | Comb offset 515 | Note |
|---|---|---|---|
| Port 0 | n_CS1 | k_TC | In SRS-Resource configuration |
| Port 1 | (n_CS1+2) mod 8 | k_TC | |
| Port 2 | (n_CS1+4) mod 8 | k_TC | k_TC is "combOffset" |
| Port 3 | (n_CS1+6) mod 8 | k_TC | n_CS is "cyclicShift" |
| Port 4 | n_CS2 | (k_TC + 1) mod 2 | Port index can be permuted |
| Port 5 | (n_CS2+4) mod 8 | (k_TC + 1) mod 2 | |

```
SRS-Resource : :=
    Srs-ResourceId
    NrofSRS-Ports
    Ptrs-PortIndex
    transmissionComb
        n2
            combOffset-n2
            cyclicShift-n2
    },
    n4
        combOffset-n4
        cyclicShift-n4
    }
},
```

```
SEQUENCE {
    SRS-ResourceId,
    ENUMERATED  { ports1, ports2, ports4 },
    ENUMERATED  {n0, n1}
    CHOICE {
    SEQUENCE {
        INTEGER  (0. .1),
        INTEGER  (0. .7)

SEQUENCE {
        INTEGER  (0. .3),
        INTEGER  (0. .11)
```

560
570
550

| SRS 505 | Cyclic Shift 510 | Comb offset 515 | Note |
|---|---|---|---|
| Port 0 | n_CS1 | k_TC | In SRS-Resource configuration<br>k_TC is "combOffset"<br>n_CS is "cyclicShift"<br>Port index can be permuted |
| Port 1 | (n_CS1+2) mod 8 | k_TC | |
| Port 2 | (n_CS1+4) mod 8 | k_TC | |
| Port 3 | (n_CS1+6) mod 8 | k_TC | |
| Port 4 | n_CS2 | (k_TC + 1) mod 2 | |
| Port 5 | (n_CS2+4) mod 8 | (k_TC + 1) mod 2 | |

```
SRS-Resource ::=     SEQUENCE {
    Srs-ResourceId           SRS-ResourceId,
    NrofSRS-Ports            ENUMERATED  { ports1, ports2, ports4 },
    Ptrs-PortIndex           ENUMERATED  {n0, n1}
    transmissionComb         CHOICE {
        n2                   SEQUENCE {
            combOffset-n2        INTEGER   (0. .1),
            cyclicShift-n2       INTEGER   (0. .7)
        },
        n4                   SEQUENCE {
            combOffset-n4        INTEGER   (0. .3),
            cyclicShift-n4       INTEGER   (0. .11)
        }
    }
}
```

Fig. 5

CODEBOOK AND NON-CODEBOOK SUPPORT FOR SRS WITH 6 PORTS

BACKGROUND

Transmission of sounding reference signals (SRS) has evolved over different releases of the Fifth Generation New Radio (5G NR) standards. In Release 15, SRS can only be transmitted in the last 6 symbols of each slot, SRS can be repeated up to 4 symbols and SRS supports Comb 2/4. In Release 16, SRS can be transmitted in any symbol, SRS repetition with 8/12 symbols is supported and SRS supports Comb 8 with 1 or 2 SRS ports. In Release 17, RB-level Partial Frequency Sounding (RPFS) is supported including start physical resource block (PRB) location hopping, SRS repetition with 10/14 symbols is supported and Comb 8 is supported with a maximum 6 cyclic shifts (CS) and 4 SRS ports.

In future releases, there may be further extensions related to SRS transmissions including support for 6 ports SRS resource, support for 6 Tx codebook UL operation and support for 6 Tx non-Codebook UL operation. However, there are technical challenges for implementing the SRS with 6 ports that results in the extension being a non-trivial solution from 4 SRS ports.

SUMMARY

Some exemplary embodiments are related to a processor of a user equipment (UE) configured to receive a sounding reference signal (SRS) configuration from a network, wherein the SRS configuration comprises a 6 port SRS configuration and transmit, from each of the 6 ports, SRS on one or more SRS resources corresponding to the SRS configuration.

Other exemplary embodiments are related to a user equipment (UE) having a transceiver configured to communicate with a network and a processor communicatively coupled to the transceiver and configured to receive a sounding reference signal (SRS) configuration from a network, wherein the SRS configuration comprises a 6 port SRS configuration and transmit, from each of the 6 ports, SRS on one or more SRS resources corresponding to the SRS configuration.

Still further exemplary embodiments are related to processor of a base station configured to configure a sounding reference signal (SRS) configuration comprising a 6 port SRS configuration and transmit, to a user equipment (UE), the SRS configuration.

BRIEF DESCRIPTION OF THE DRAWINGS

FIG. 5 shows an exemplary table for support of 6 port SRS with Comb 2 according to various exemplary embodiments.

DETAILED DESCRIPTION

Figure 1:
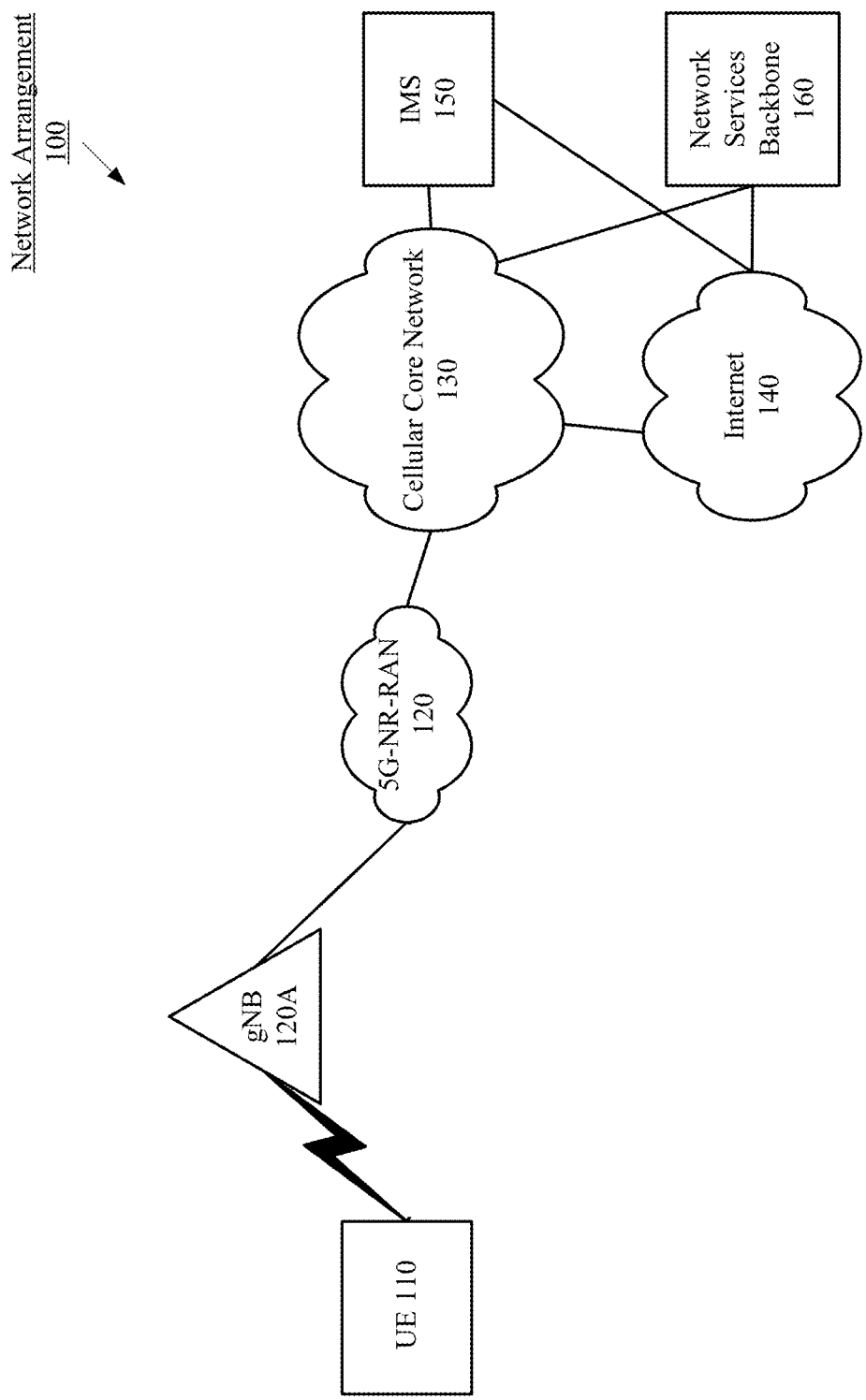
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to supporting SRS transmission with 6 ports.

The exemplary embodiments are described with regard to a user equipment (UE). However, reference to the term UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate type of electronic component.

The exemplary embodiments are also described with regard to a fifth generation (5G) New Radio (NR) network. However, reference to a 5G NR network is merely provided for illustrative purposes. The exemplary embodiments may be applied to any appropriate type of network that supports SRS transmissions, including networks associated with future evolutions of the cellular standards, e.g., 6G networks.

Currently, NR uplink (UL) supports two multiple input/multiple output (MIMO) operation modes (codebook and non-codebook) and only supports up to 4 layers. In codebook based UL, e.g., SRS resource set usage="codebook", the UE transmits SRS resources with multiple ports, the network schedules the Physical Uplink Shared Channel (PUSCH) by indicating a transmit precoding matrix (TPMI) and a rank indication (RI). In Non-Codebook based UL, e.g., SRS resource set usage="nonCodebook", the UE transmits multiple SRS resources, each with single port, and the network schedules PUSCH by indicating the SRS resource/port selection and RI.

The exemplary embodiments are related to supporting a 6 port SRS resource, support for 6 Tx codebook UL operation and support for 6 Tx non-Codebook UL operation. Each of these exemplary embodiments will be described in greater detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., a sixth generation (6G) network, a 5G cloud RAN, a next generation RAN (NG-RAN), a long-term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have at least a 5G NR chipset to communicate with the 5G NR RAN 120.

The 5G NR RAN 120 may be a portion of a cellular network that may be deployed by a network carrier (e.g., Verizon, AT&T, I-Mobile, etc.). The 5G NR RAN 120 may include, for example, base stations or access nodes (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a subscriber identity module (SIM) card). Upon detecting the presence of the 5G NR RAN 120, the UE 110 may transmit the corresponding credential information to associate with the 5G NR RAN 120. More specifically, the UE 110 may associate with a specific base station, e.g., the gNB 120A.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
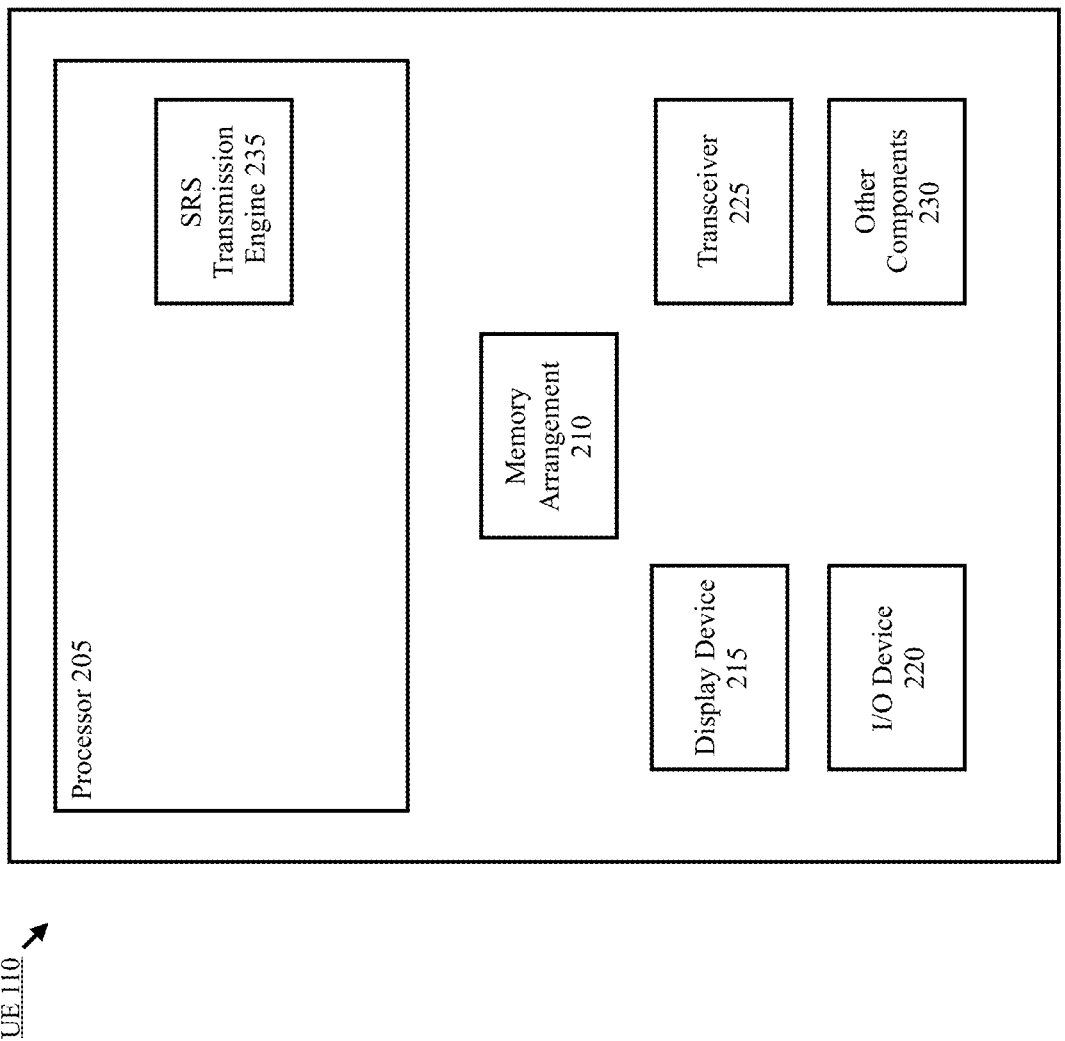
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an SRS transmission engine 235. The SRS transmission engine 235 may perform various operations such as, but not limited to, transmitting SRS according to a configuration received from the network, where the configuration comprises transmitting the SRS on 6 ports, and supporting codebook and non-codebook 6 transmission UL operations.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engine may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
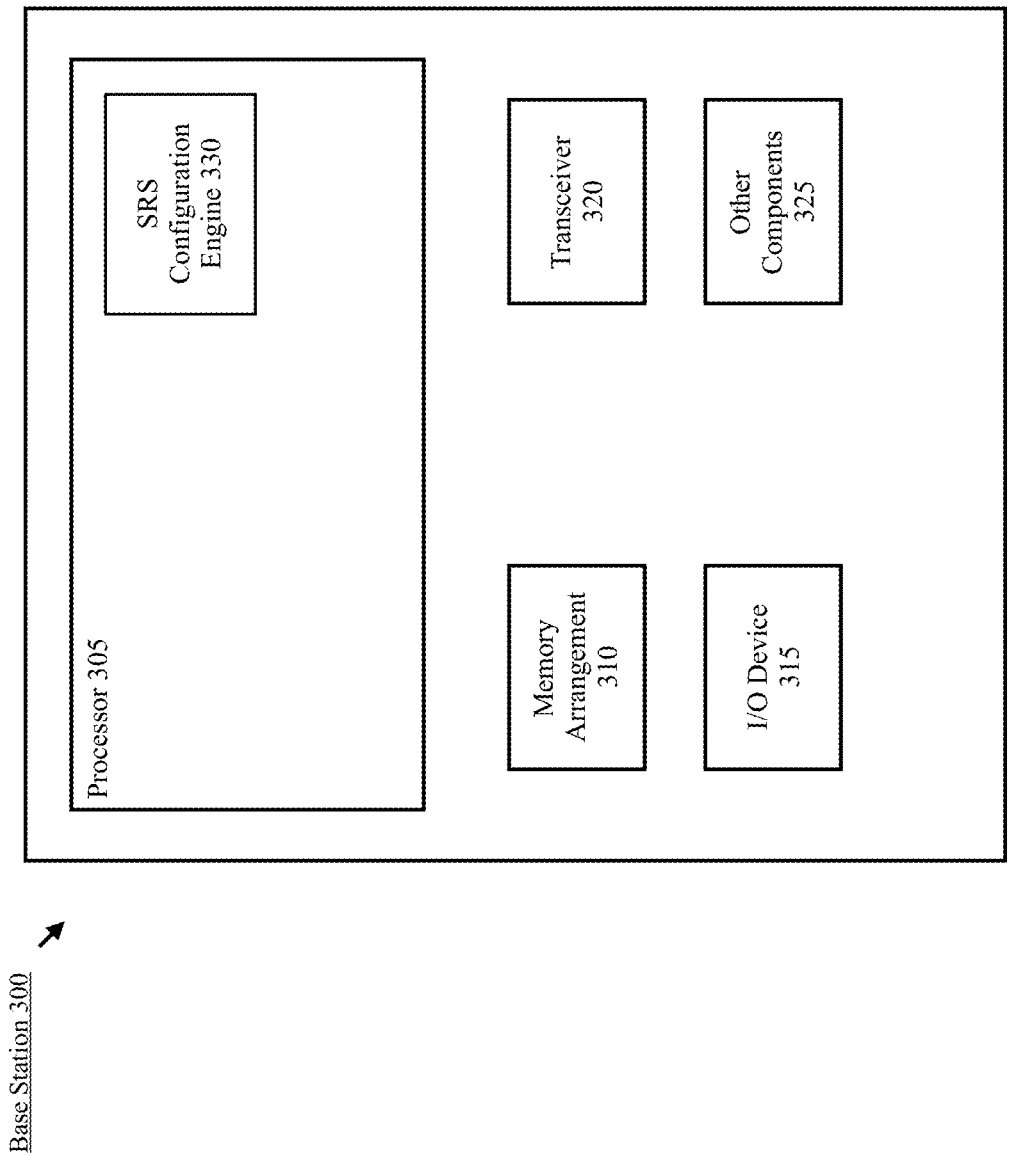
FIG. 3 shows an exemplary base station according to various exemplary embodiments.

FIG. 3 shows an exemplary base station 300 according to various exemplary embodiments. The base station 300 may represent the gNB 120A or any other type of access node through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices and/or power sources, transceiver chains, antenna elements, etc.

The processor 305 may be configured to execute a plurality of engines of the base station 300. For example, the engines may include an SRS configuration engine 330. The SRS configuration engine 330 may perform various operations such as, but not limited to, transmitting an SRS configuration to a UE that comprises a schedule for transmitting the SRS on 6 ports.

The software being executed by the processor 305 is only exemplary. The functionality associated with the software may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Figure 4:
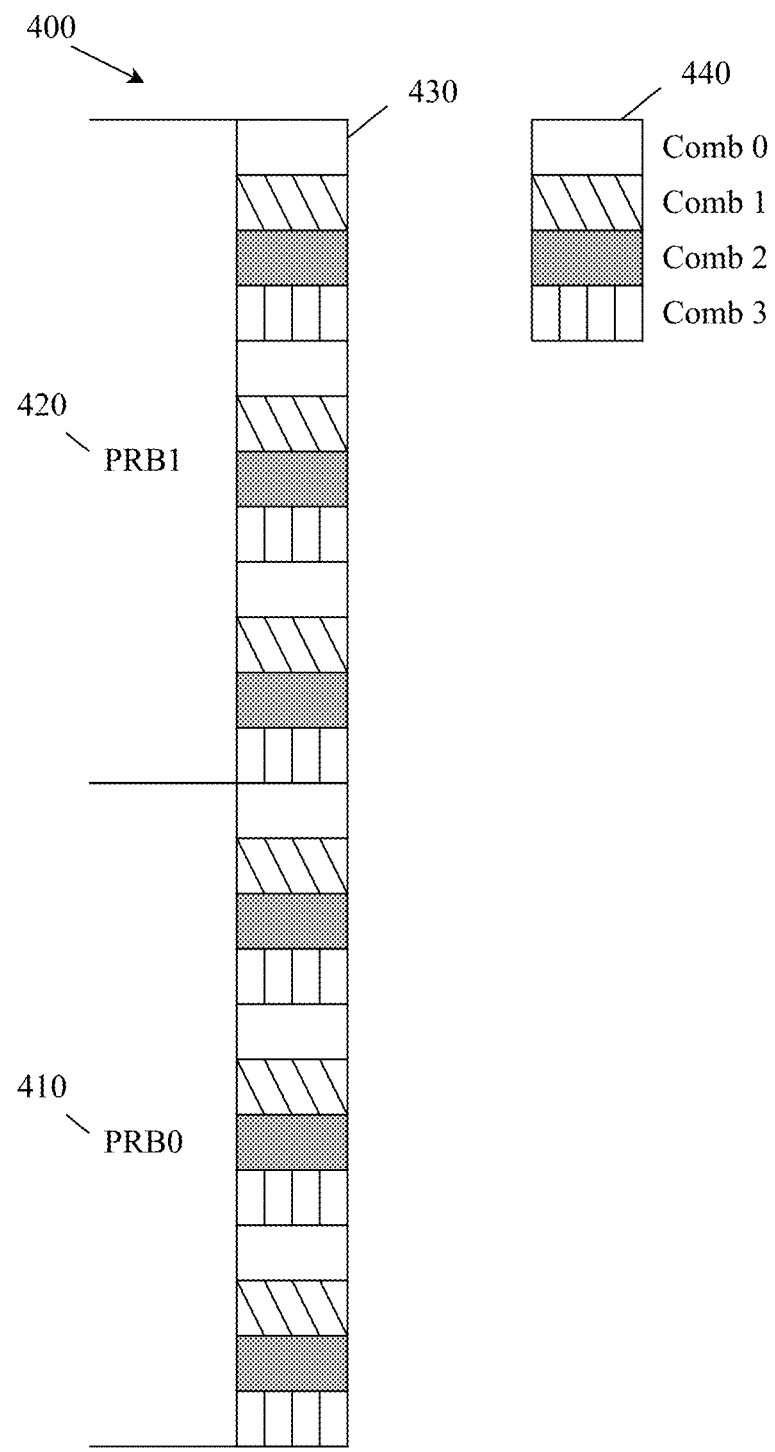
FIG. 4 shows a mapping of SRS resources to a frequency domain resource with a comb structure according to various exemplary embodiments.

Prior to describing the exemplary embodiments, the following will provide some background on SRS in NR. The background is described with reference to FIG. 4. FIG. 4 shows a mapping 400 of SRS resources to a frequency domain resource with a comb structure according to various exemplary embodiments. FIG. 4 shows a first physical resource block (PRB0) 410 and a second PRB1 420 in the frequency domain. Each PRB comprises twelve (12) resource elements. A SRS sequence supports the following lengths {6, 12, 18, 24, any sequence>=36}. A SRS sequence is mapped to a frequency domain resource, e.g., RE 430 with a comb structure. In the example of FIG. 4, four (4) comb structures 440 are shown including a mapping to the corresponding RE 430. In NR, SRS supports Comb 2/4/8. Comb N (N=2/4/8) subsamples the RE with a factor N. Different Comb are orthogonal because they are non-overlapping in frequency.

Multiple cyclic shift sequences are applied on top of the same SRS sequence. A length M cyclic shift sequence can have M orthogonal sequences. This results in M orthogonal SRS sequences using the same SRS comb offset. In NR, the cyclic shift sequence length M is a function of Comb size N and is defined by standard. Comb 2 has a maximum 8 cyclic shifts, Comb 4 has a maximum 12 cyclic shifts and Comb 8 has a maximum 6 cyclic shifts.

The following exemplary embodiments will describe extending support for the SRS to 6 ports with Comb 2/4/8. When describing the exemplary embodiments, the SRS sequence may be considered to be mapped to the frequency domain resource as illustrated in FIG. 4.

FIG. 5 shows an exemplary table 500 for support of 6 port SRS with Comb 2 according to various exemplary embodiments. The table 400 includes a column 505 indicating the port number (e.g., Port 0-5), a column 510 including a cyclic shift (CS) for the port and a column 515 including the Comb offset (k_TC) for the port. The values of each of these parameters will be described in greater detail below.

As described above, the maximum number of cyclic shifts for Comb 2 is 8 and that remains the same for the 6 port SRS with Comb 2. Thus, the first four ports of the six ports are supported in the first Comb offset k_TC. As shown in table 400, for Ports 0/1/2/3 the SRS are located in (n_CS$_1$+0/2/4/6) mod 8 in Comb offset k_TC, respectively. For example, Port 0 is located in n_CS$_1$ with the Comb offset k_TC, Port 0 is located in (n_CS$_1$+2) mod 8 with the Comb offset k_TC, etc. The mod 8 operator is based on the maximum number of cyclic shifts. From these values for the cyclic shift and Comb offset, it can be seen for the first Comb offset k_TC, the SRS will have equal spacing.

The fifth and sixth ports of the six ports are supported in the second Comb offset (k_TC+1) mod 2. Thus, Ports 4/5 are located in (n_CS$_2$+0/4) mod 8 with Comb offset (k_TC+1) mod 2, respectively. In this example, because there is only 2 ports in the second Comb offset (k_TC+1), the SRS will be spaced 4 REs apart, e.g., 0/4, 1/5, 2/6, 3/7, depending on the starting point. There may be multiple options for the starting point. In a first option a single cyclic shift is configured per SRS-Resource, n_CS$_1$=n_CS$_2$. In a second option, an additional cyclic shift can be configured per SRS-Resource, one for n_CS$_1$ and one for n_CS$_2$.

FIG. 5 also shows an information element (IE) SRS-Resource 550 for configuring the SRS. As described above, in a first option a single cyclic shift is configured per SRS-Resource, n_CS$_1$=n_CS$_2$. Since the IE 450 already includes an n2 IE 560 for configuring the SRS with a single cyclic shift, the current IE 550 is sufficient for this purpose. However, if the second option of configuring an additional cyclic shift is used, a new IE n4 570 may be added to the IE 550 to configure the additional cyclic shift.

Figure 6:
FIG. 6 shows an exemplary table for support of 6 port SRS with Comb 4 according to various exemplary embodiments.

FIG. 6 shows an exemplary table 600 for support of 6 port SRS with Comb 4 according to various exemplary embodiments. The table 600 includes a column 605 indicating the port number (e.g., Port 0-5), a column 610 including a cyclic shift (CS) for the port and a column 615 including the Comb offset (k_TC) for the port. The values of each of these parameters will be described in greater detail below.

As described above, the maximum number of cyclic shifts for Comb 4 is 12 and that remains the same for the 6 port SRS with Comb 4. In this example, because the maximum number of cyclic shifts is 12 and this is an integer multiple of 6, all 6 ports can be supported using the same Comb offset k_TC. Thus, as shown in table 500, for Ports 0/1/2/3/4/5 the SRS are located in (n_CS+0/2/4/6/8/10) mod 12 in Comb offset k_TC, respectively. From these values for the cyclic shift and Comb offset, it can be seen the SRS will have equal spacing.

Figure 7:
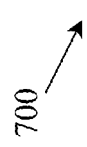
FIG. 7 shows an exemplary table for support of 6 port SRS with Comb 8 according to various exemplary embodiments.

FIG. 7 shows an exemplary table 700 for support of 6 port SRS with Comb 8 according to various exemplary embodiments. The table 700 includes a column 705 indicating the port number (e.g., Port 0-5), a column 710 including a cyclic shift (CS) for the port and a column 715 including the Comb offset (k_TC) for the port. The values of each of these parameters will be described in greater detail below.

As described above, the maximum number of cyclic shifts for Comb 8 is 6 and that remains the same for the 6 port SRS with Comb 8. In this example, because the maximum number of cyclic shifts is 6 and this is also an integer multiple of 6, all 6 ports can be supported using the same Comb offset k_TC just as in the case of the Comb 4 example provided above. Thus, as shown in table 600, for Ports 0/1/2/3/4/5 the SRS are located in (n_CS+0/1/2/3/4/5) mod 6 in Comb offset k_TC, respectively. From these values for the cyclic shift and Comb offset, it can be seen the SRS will have equal spacing.

As described above, because the maximum number of cyclic shifts for Comb 2 is 8 and that is not an integer multiple of 6, the 6 ports need to be spread out over 2 Comb offsets in the above example of FIG. 5. In contrast, because the cyclic shifts for Comb 4 and Comb 8 are integer multiples of 6, the 6 ports may use the same Comb offset as shown in the examples of FIGS. 6 and 7.

Thus, in some exemplary embodiments, the maximum number of cyclic shifts for 6 port SRS with Comb 2 may be changed. In a first option, the network may configure a maximum number of 6 cyclic shifts, e.g., $n_{SRS}^{CS,Max}=6$. This would allow all the cyclic shifts, e.g., CS(0,1,2,3,4,5), in the same SRS Comb offset to be used to support 6 port SRS. In a second option, the network may configure a maximum number of 12 cyclic shifts, e.g., $n_{SRS}^{CS,Max}=12$. This would allow 6 cyclic shifts with equal distance in the same SRS Comb offset to be used to support 6 port SRS. In this option, the network may configure the UE with a starting offset for the cyclic shifts. For example, 6 port SRS may be supported with either even or odd cyclic shifts, e.g., CS{0,2,4,6,8,10) or CS{1,3,5,7,9,11).

In some exemplary embodiments, to support 6 ports for SRS, the step size of the cyclic shift increment for cyclic shift to SRS port mapping may also be configured. For example, for SRS port i, where i is 0, 1, 2, 3, 4, 5, the SRS cyclic shift may be configured as:

$$(n\_CS+i*CS\_step) \bmod CS\_max$$

where, n_CS is the cyclic shift,
CS_max is the maximum number of cyclic shifts,
CS_step is the cyclic shift step size for cyclic shift to SRS port mapping.

To provide an example, it may be considered that for 6 port SRS support for Comb 2 with a maximum of 8 cyclic shifts. In a first example configuration, n_CS=0, CS_max=8, CS_step=1. Thus, the 6 SRS ports use CS(0,1,2,3,4,5). In this example, it can be seen that the SRS will not have an equal distance between each port, e.g., the distance between port 5 and port 0 is greater than the distance between the other ports.

In a second example configuration, n_CS=1, CS_max=8, CS_step=3. Thus, the 6 SRS ports use CS(1,4,7,2,5,0). In this example, the distance is the same between each of the ports except port 5 and port 0. When selecting the step size, a prime number should be selected as it will guarantee that a different cyclic shift is used for each different SRS port.

In some exemplary embodiments, to support 6 ports for SRS in SRS-Resource configuration, the network may explicitly configure the mapping of each SRS resource to different cyclic shifts and/or Comb offset. In a first option, for each SRS port in the same SRS resource, the same comb offset may be used and the network can explicitly configure which cyclic shift is used for each SRS port. In a second option, for each SRS port in the same SRS resource, a different comb offset can be used. In this option, the network can explicitly configure which (cyclic shift, comb offset) are used for each SRS port. The first and the second option may be used together.

As described above, the following exemplary embodiments are related to codebook based UL, e.g., SRS resource set usage="codebook", where the UE transmits SRS resources with multiple ports, the network schedules the Physical Uplink Shared Channel (PUSCH) by indicating a transmit precoding matrix (TPMI) and a rank indication (RI).

In some exemplary embodiments, the UE 110 may be a basic UE that does not support full power transmission mode 2. In these examples, to support 6 Tx codebook based UL PUSCH operation, up to 2 SRS-Resources can be configured in the same SRS-ResourceSet. Each SRS-Resource is configured with 6 ports.

In other exemplary embodiments, the UE 110 may be an advanced UE that supports full power transmission mode 2. In these examples, to support 6 Tx codebook based UL PUSCH operation, up to 4 SRS-Resources can be configured in the same SRS-ResourceSet. Different SRS-Resource can be configured with different numbers of ports and at least one of the SRS-Resource is configured with 6 ports.

In some exemplary embodiments, to support 6 Tx codebook based UL PUSCH operation, in the SRS-ResourceSet configured with usage="codebook", a pair (2) of SRS-Resources can be configured in the same SRS-ResourceSet to support 6 ports SRS sounding. One of the SRS-Resources can be configured with 4 ports and the other SRS-Resource can be configured with 2 ports.

In other exemplary embodiments, 2 pairs of SRS-Resources can be configured in the same SRS-ResourceSet to support 6 ports SRS sounding. In each pair of SRS-Resources, one SRS-Resource can be configured with 4 ports, the other SRS-Resource can be configured with 2 ports. In these exemplary embodiments, the SRS resource indicator (SRI) field in the scheduling Downlink Control Information (DCI) or configured grant (CG) configuration indicates one of the two pairs of SRS-Resources. This may be used, for example, for UE Tx panel selection. Some advanced UEs may be equipped with two panels for UL transmission, each panel with 6 ports. NW can configure UE to sound both panels using two pairs of SRS resources. Based on the SRS measurement at the gNB, the gNB can determine which panel to use, or which panel has better quality and select the corresponding panel via SRI in DCI.

The TPMI, i.e., "Precoding information and number of layers" field in the scheduling DCI or CG configuration may include the mapping of the precoder to the Tx ports. In a first option, ports in the 2 port SRS is concatenated after ports in the 4 port SRS. In a second option, ports in the 4 port SRS is concatenated after ports in the 2 port SRS.

As described above, the following exemplary embodiments are related non-codebook based UL, e.g., SRS resource set usage="nonCodebook", where the UE transmits multiple SRS resources, each with single port, and the network schedules PUSCH by indicating the SRS resource/port selection and RI via SRI field in the scheduling Downlink Control Information (DCI) or configured grant (CG) configuration.

To support 6 Tx nonCodebook based UL PUSCH operation, in the SRS-ResourceSet configured with usage="nonCodebook" 6 SRS resources are configured, each SRS resource has 1 port.

EXAMPLES

In a first example, a method performed by a user equipment (UE) comprising receiving a sounding reference signal (SRS) configuration from a network, wherein the SRS configuration comprises a 6 port SRS configuration and transmitting, from each of the 6 ports, SRS on one or more SRS resources corresponding to the SRS configuration.

In a second example, the method of the first example, wherein the SRS configuration further comprises the 6 port SRS configuration with a comb 2 and a maximum number of cyclic shifts of 8, wherein a first 4 of the 6 ports are transmitted using a first set of cyclic shifts having a first comb offset in a first SRS comb and a second 2 of the 6 ports are transmitted using a second set of cyclic shifts having a second comb offset in a second SRS comb.

In a third example, the method of the first example, wherein the first set of cyclic shifts and the second set of cyclic shifts have a same value or a different value.

In a fourth example, the method of the first example, wherein the SRS configuration further comprises the 6 port SRS configuration with a comb 4 and a maximum number of cyclic shifts of 12, wherein each of the 6 ports are transmitted using a set of cyclic shifts having a same comb offset in a same SRS comb.

In a fifth example, the method of the first example, wherein the SRS configuration further comprises the 6 port SRS configuration with a comb 8 and a maximum number of cyclic shifts of 6, wherein each of the 6 ports are transmitted using a set of cyclic shifts having a same comb offset in a same SRS comb.

In a sixth example, the method of the first example, wherein the SRS configuration further comprises the 6 port SRS configuration with a comb 2 and a maximum number of cyclic shifts of 6, wherein each of the 6 ports are transmitted using a set of cyclic shifts having a same comb offset in a same SRS comb.

In a seventh example, the method of the first example, wherein the SRS configuration further comprises the 6 port SRS configuration with a comb 2 and a maximum number of cyclic shifts of 12, wherein each of the 6 ports are transmitted using a set of cyclic shifts having a same comb offset in a same SRS comb.

In an eighth example, the method of the seventh example, wherein the SRS configuration further comprises a cyclic shift starting offset, wherein applying the cyclic shift starting offset results in each of the 6 ports having an even cyclic shift or each of the 6 ports having an odd cyclic shift.

In a ninth example, the method of the first example, wherein the SRS configuration further comprises a cyclic shift step size, wherein the 6 port SRS is transmitted based on (n_CS+i*CS_step) mod CS_max, where, n_CS is the cyclic shift, CS_max is a maximum number of cyclic shifts, CS_step is the cyclic shift step size for cyclic shift to SRS port mapping and i is a port number.

In a tenth example, the method of the first example, wherein the SRS configuration further comprises a respective cyclic shift for each port in a same SRS resource, wherein a comb offset has a same value for each of the ports.

In an eleventh example, the method of the first example, wherein the SRS configuration further comprises a respective cyclic shift and a respective comb offset for each port in a same SRS resource.

In a twelfth example, the method of the first example, wherein the SRS configuration further comprises an indication that a codebook transmission is to be used.

In a thirteenth example, the method of the twelfth example, wherein the UE does not support full power transmission mode 2 and wherein the SRS configuration further comprises up to 2 SRS resources configured in a same SRS resource set, wherein each SRS resource is configured with 6 ports.

In a fourteenth example, the method of the twelfth example, wherein the UE supports full power transmission mode 2 and wherein the SRS configuration further comprises up to 4 SRS resources configured in a same SRS resource set, wherein at least one of the SRS resources is configured with 6 ports.

In a fifteenth example, the method of the fourteenth example, wherein at least one other of the SRS resources is configured with a different number of ports than the least one of the SRS resources configured with 6 ports.

In a sixteenth example, the method of the first example, wherein the SRS configuration further comprises a pair of SRS resources configured in a same SRS resource set to support 6 port SRS, wherein a first SRS resource of the pair is configured with 4 ports and a second SRS resource of the pair is configured with 2 ports.

In a seventeenth example, the method of the first example, wherein the SRS configuration further comprises 2 pairs of SRS resources configured in the same SRS resource set to support 6 ports SRS, wherein a first SRS resource of a first pair is configured with 4 ports and a second SRS resource of the first pair is configured with 2 ports and a first SRS resource of a second pair is configured with 4 ports and a second SRS resource of the second pair is configured with 2 ports.

In an eighteenth example, the method of the seventeenth example, wherein the SRS configuration further comprises an SRS resource indicator field indicating one of the two pairs of SRS resources, wherein the SRS configuration is received via scheduling Downlink Control Information (DCI) or a configured grant (CG) configuration.

In an nineteenth example, the method of the eighteenth example, wherein a transmit precoding matrix (TPMI) field of the scheduling DCI or CG configuration indicates (i) ports in the 2 port SRS resource is concatenated after ports in the 4 port SRS resource or (ii) ports in the 4 port SRS resource is concatenated after ports in the 2 port SRS resource.

In a twentieth example, the method of the first example, wherein the SRS configuration further comprises an indication that a non-codebook transmission is to be used, wherein each of the one or more SRS resources has 1 port.

In a twenty first example, a user equipment (UE) comprises a transceiver configured to communicate with a network and a processor communicatively coupled to the transceiver and configured to perform any of the methods of the first through twentieth examples.

In a twenty second example, a method performed by a base station comprising configuring a sounding reference signal (SRS) configuration comprising a 6 port SRS configuration and transmitting, to a user equipment (UE), the SRS configuration.

In a twenty third example, the method of the twenty second example, wherein the SRS configuration further comprises the 6 port SRS configuration with a comb 2 and a maximum number of cyclic shifts of 8, wherein a first 4 of the 6 ports are transmitted using a first set of cyclic shifts having a first comb offset in a first SRS comb and a second 2 of the 6 ports are transmitted using a second set of cyclic shifts having a second comb offset in a second SRS comb.

In a twenty fourth example, the method of the twenty second example, wherein the first set of cyclic shifts and the second set of cyclic shifts have a same value or a different value.

In a twenty fifth example, the method of the twenty second example, wherein the SRS configuration further comprises the 6 port SRS configuration with a comb 4 and a maximum number of cyclic shifts of 12, wherein each of the 6 ports are transmitted using a set of cyclic shifts having a same comb offset in a same SRS comb.

In a twenty sixth example, the method of the twenty second example, wherein the SRS configuration further comprises the 6 port SRS configuration with a comb 8 and a maximum number of cyclic shifts of 6, wherein each of the 6 ports are transmitted using a set of cyclic shifts having a same comb offset in a same SRS comb.

In a twenty seventh example, the method of the twenty second example, wherein the SRS configuration further comprises the 6 port SRS configuration with a comb 2 and a maximum number of cyclic shifts of 6, wherein each of the 6 ports are transmitted using a set of cyclic shifts having a same comb offset in a same SRS comb.

In a twenty eighth example, the method of the twenty second example, wherein the SRS configuration further comprises the 6 port SRS configuration with a comb 2 and a maximum number of cyclic shifts of 12, wherein each of the 6 ports are transmitted using a set of cyclic shifts having a same comb offset in a same SRS comb.

In a twenty ninth example, the method of the twenty eighth example, wherein the SRS configuration further comprises a cyclic shift starting offset, wherein applying the cyclic shift starting offset results in each of the 6 ports having an even cyclic shift or each of the 6 ports having an odd cyclic shift.

In a thirtieth example, the method of the twenty second example, wherein the SRS configuration further comprises a cyclic shift step size, wherein the 6 port SRS is transmitted based on (n_CS+i*CS_step) mod CS_max, where, n_CS is the cyclic shift, CS_max is a maximum number of cyclic shifts, CS_step is the cyclic shift step size for cyclic shift to SRS port mapping and i is a port number.

In a thirty first example, the method of the twenty second example, wherein the SRS configuration further comprises a respective cyclic shift for each port in a same SRS resource, wherein a comb offset has a same value for each of the ports.

In a thirty second example, the method of the twenty second example, wherein the SRS configuration further comprises a respective cyclic shift and a respective comb offset for each port in a same SRS resource.

In a thirty third example, the method of the twenty second example, wherein the SRS configuration further comprises an indication that a codebook transmission is to be used.

In a thirty fourth example, the method of the thirty third example, wherein the UE does not support full power transmission mode 2 and wherein the SRS configuration further comprises up to 2 SRS resources configured in a same SRS resource set, wherein each SRS resource is configured with 6 ports.

In a thirty fifth example, the method of the thirty third example, wherein the UE supports full power transmission mode 2 and wherein the SRS configuration further comprises up to 4 SRS resources configured in a same SRS resource set, wherein at least one of the SRS resources is configured with 6 ports.

In a thirty sixth example, the method of the thirty fifth example, wherein at least one other of the SRS resources is configured with a different number of ports than the least one of the SRS resources configured with 6 ports.

In a thirty seventh example, the method of the twenty second example, wherein the SRS configuration further comprises a pair of SRS resources configured in a same SRS resource set to support 6 port SRS, wherein a first SRS resource of the pair is configured with 4 ports and a second SRS resource of the pair is configured with 2 ports.

In a thirty eighth example, the method of the twenty second example, wherein the SRS configuration further comprises 2 pairs of SRS resources configured in the same SRS resource set to support 6 ports SRS, wherein a first SRS resource of a first pair is configured with 4 ports and a second SRS resource of the first pair is configured with 2 ports and a first SRS resource of a second pair is configured with 4 ports and a second SRS resource of the second pair is configured with 2 ports.

In a thirty ninth example, the method of the thirty eighth example, wherein the SRS configuration further comprises an SRS resource indicator field indicating one of the two pairs of SRS resources, wherein the SRS configuration is received via scheduling Downlink Control Information (DCI) or a configured grant (CG) configuration.

In a fortieth example, the method of the thirty ninth example, wherein a transmit precoding matrix (TPMI) field of the scheduling DCI or CG configuration indicates (i) ports in the 2 port SRS resource is concatenated after ports in the 4 port SRS resource or (ii) ports in the 4 port SRS resource is concatenated after ports in the 2 port SRS resource.

In a forty first example, the method of the twenty second example, wherein the SRS configuration further comprises an indication that a non-codebook transmission is to be used, wherein each of the one or more SRS resources has 1 port.

In a forty second example, a base station comprises a transceiver configured to communicate with a user equipment (UE) and a processor communicatively coupled to the transceiver and configured to perform any of the methods of the twenty second through forty first examples.

In a forty third example, a processor of a base station is configured to perform any of the methods of the twenty second through forty first examples.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to:
receive a sounding reference signal (SRS) configuration from a network, wherein the SRS configuration comprises a 6 port SRS configuration including a cyclic shift step size, wherein the cyclic shift step size is a prime number; and
generate, for transmission from each of 6 ports, SRS on one or more SRS resources corresponding to the SRS configuration, wherein 6 port SRS is transmitted based on (n_CS+i*CS_step) mod CS_max, where, n_CS is a cyclic shift, CS_max is a maximum number of cyclic shifts, CS_step is the cyclic shift step size and i is a port number.

2. The processor of claim 1, wherein the SRS configuration further comprises the 6 port SRS configuration with a comb 2 and a maximum number of cyclic shifts of 8, wherein a first 4 of the 6 ports are transmitted using a first set of cyclic shifts having a first comb offset in a first SRS comb and a second 2 of the 6 ports are transmitted using a second set of cyclic shifts having a second comb offset in a second SRS comb.

3. The processor of claim 2, wherein the first set of cyclic shifts and the second set of cyclic shifts have a same value or a different value.

4. The processor of claim 1, wherein the SRS configuration further comprises the 6 port SRS configuration with a comb 4 and a maximum number of cyclic shifts of 12, wherein each of the 6 ports are transmitted using a set of cyclic shifts having a same comb offset in a same SRS comb.

5. The processor of claim 1, wherein the SRS configuration further comprises the 6 port SRS configuration with a comb 8 and a maximum number of cyclic shifts of 6, wherein each of the 6 ports are transmitted using a set of cyclic shifts having a same comb offset in a same SRS comb.

6. The processor of claim 1, wherein the SRS configuration further comprises the 6 port SRS configuration with a comb 2 and a maximum number of cyclic shifts of 6, wherein each of the 6 ports are transmitted using a set of cyclic shifts having a same comb offset in a same SRS comb.

7. The processor of claim 1, wherein the SRS configuration further comprises the 6 port SRS configuration with a comb 2 and a maximum number of cyclic shifts of 12, wherein each of the 6 ports are transmitted using a set of cyclic shifts having a same comb offset in a same SRS comb.

8. The processor of claim 7, wherein the SRS configuration further comprises a cyclic shift starting offset, wherein applying the cyclic shift starting offset results in each of the 6 ports having an even cyclic shift or each of the 6 ports having an odd cyclic shift.

9. The processor of claim 1, wherein the SRS configuration further comprises a respective cyclic shift for each port in a same SRS resource, wherein a comb offset has a same value for each of the ports.

10. The processor of claim 1, wherein the SRS configuration further comprises a respective cyclic shift and a respective comb offset for each port in a same SRS resource.

11. The processor of claim 1, wherein the SRS configuration further comprises an indication that a codebook transmission is to be used.

12. The processor of claim 11, wherein the UE does not support full power transmission mode 2 and wherein the SRS configuration further comprises up to 2 SRS resources configured in a same SRS resource set, wherein each SRS resource is configured with 6 ports.

13. The processor of claim 11, wherein the UE supports full power transmission mode 2 and wherein the SRS configuration further comprises up to 4 SRS resources configured in a same SRS resource set, wherein at least one of the SRS resources is configured with 6 ports.

14. The processor of claim 13, wherein at least one other of the SRS resources is configured with a different number of ports than the least one of the SRS resources configured with 6 ports.

15. The processor of claim 1, wherein the SRS configuration further comprises a pair of SRS resources configured in a same SRS resource set to support 6 port SRS, wherein a first SRS resource of the pair is configured with 4 ports and a second SRS resource of the pair is configured with 2 ports.

16. The processor of claim 1, wherein the SRS configuration further comprises two pairs of SRS resources configured in a same SRS resource set to support 6 ports SRS, wherein a first SRS resource of a first pair is configured with 4 ports and a second SRS resource of the first pair is configured with 2 ports and a first SRS resource of a second pair is configured with 4 ports and a second SRS resource of the second pair is configured with 2 ports.

17. The processor of claim 16, wherein the SRS configuration further comprises an SRS resource indicator field indicating one of the two pairs of SRS resources, wherein the SRS configuration is received via scheduling Downlink Control Information (DCI) or a configured grant (CG) configuration.

18. The processor of claim 17, wherein a transmit precoding matrix (TPMI) field of the scheduling DCI or CG configuration indicates (i) ports in the 2 port SRS resource is concatenated after ports in the 4 port SRS resource or (ii) ports in the 4 port SRS resource is concatenated after ports in the 2 port SRS resource.

19. The processor of claim 1, wherein the SRS configuration further comprises an indication that a non-codebook transmission is to be used, wherein each of the one or more SRS resources has 1 port.

20. An apparatus comprising processing circuitry coupled to a memory, the processing circuitry configured to:
process, based on signaling received from a base station, a sounding reference signal (SRS) configuration from a network, wherein the SRS configuration comprises a 6 port SRS configuration including a cyclic shift step size, wherein the cyclic shift step size is a prime number; and
generate, for transmission from each of 6 ports to the base station, SRS on one or more SRS resources corresponding to the SRS configuration, wherein 6 port SRS is transmitted based on (n_CS+i*CS_step) mod CS_max, where, n_CS is a cyclic shift, CS_max is a maximum number of cyclic shifts, CS_step is the cyclic shift step size and i is a port number.

* * * * *